United States Patent [19]

Kawakami et al.

[11] Patent Number: 4,963,042
[45] Date of Patent: Oct. 16, 1990

[54] HORIZONTAL LINE POSITION ADJUSTING IN FRAME PROCESSING DEVICE

[75] Inventors: Yasushi Kawakami, Nagoya; Keiichi Hirata, Kuwana; Mizuho Kamisaka, Nagasaki; Miyako Mukai, Nagoya; Tomohiro Ban, Iwakura; Minoru Ooishi, Nagoya, all of Japan

[73] Assignee: Brother Kogyo Kabushiki Kaisha, Aichi, Japan

[21] Appl. No.: 328,640

[22] Filed: Mar. 27, 1989

[30] Foreign Application Priority Data

Mar. 26, 1988 [JP] Japan .................................. 63-72258

[51] Int. Cl.$^5$ .............................................. B41J 29/26
[52] U.S. Cl. ........................................ 400/17; 400/21; 400/65
[58] Field of Search ................... 400/6, 17, 18, 21, 22, 400/65

[56] References Cited

U.S. PATENT DOCUMENTS

| | | | |
|---|---|---|---|
| 4,804,280 | 2/1989 | Kurokawa | 400/17 |
| 4,906,114 | 3/1990 | Tanaka | 400/21 |

FOREIGN PATENT DOCUMENTS

| | | | |
|---|---|---|---|
| 129005 | 12/1984 | European Pat. Off. | 400/17 |
| 20385 | 2/1982 | Japan | 400/17 |
| 108976 | 7/1982 | Japan | 400/17 |
| 82377 | 5/1983 | Japan | 400/17 |
| 156783 | 9/1984 | Japan | 400/17 |
| 241160 | 11/1986 | Japan | 400/65 |
| 140867 | 6/1987 | Japan | 400/17 |

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

In a text processing device, provided is an improved tabulation function. The vertical positions of horizontal ruled lines dividing two rows are calculated based upon the intervals existing between these columns. If the row interval is expanded or changed, the horizontal ruled lines remain consistent in a predetermined relationship with a character string.

11 Claims, 6 Drawing Sheets

FIG. I(A)
PRIOR ART
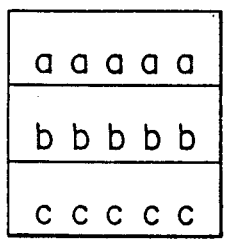
FIG. I(B)
PRIOR ART
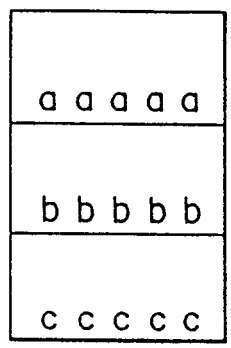

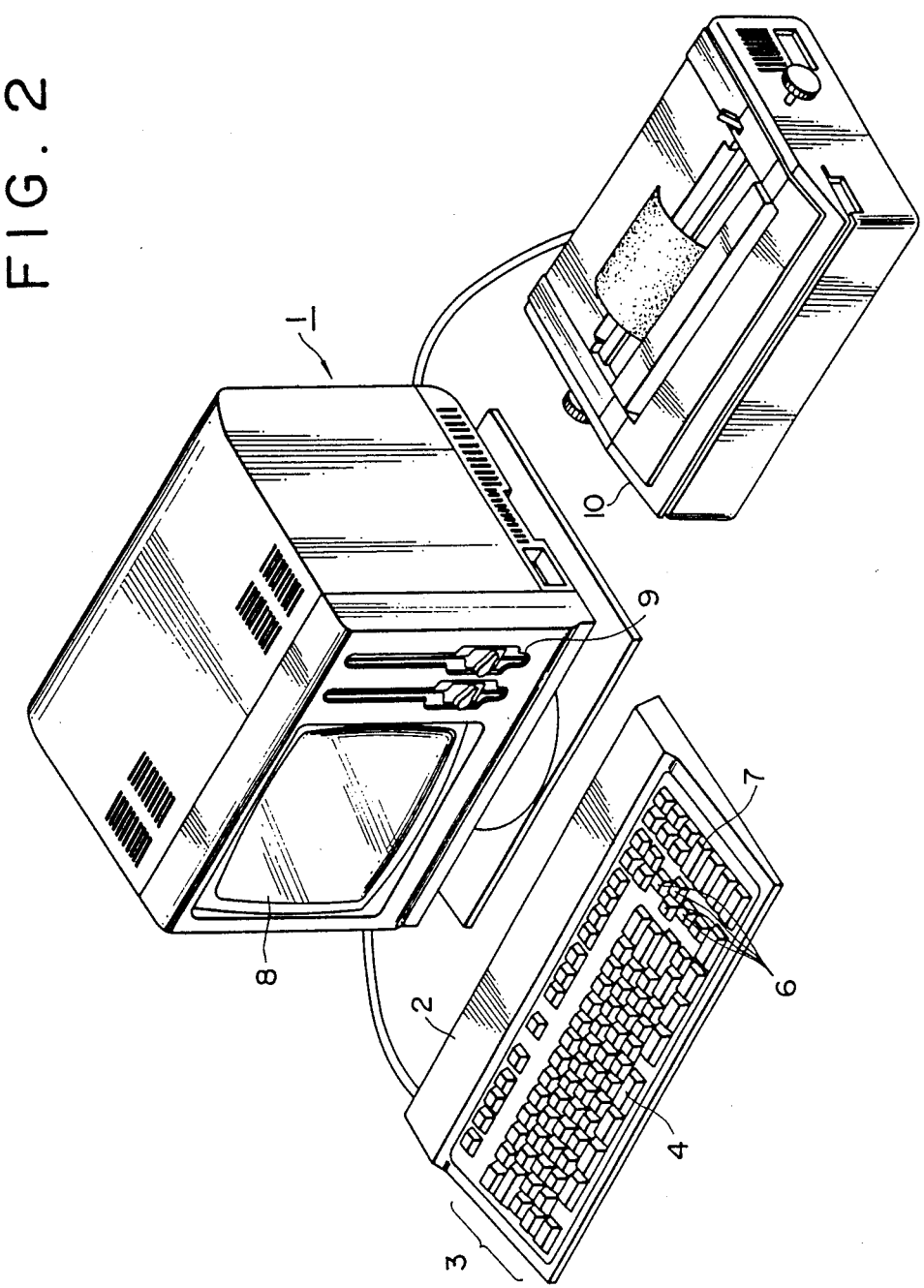

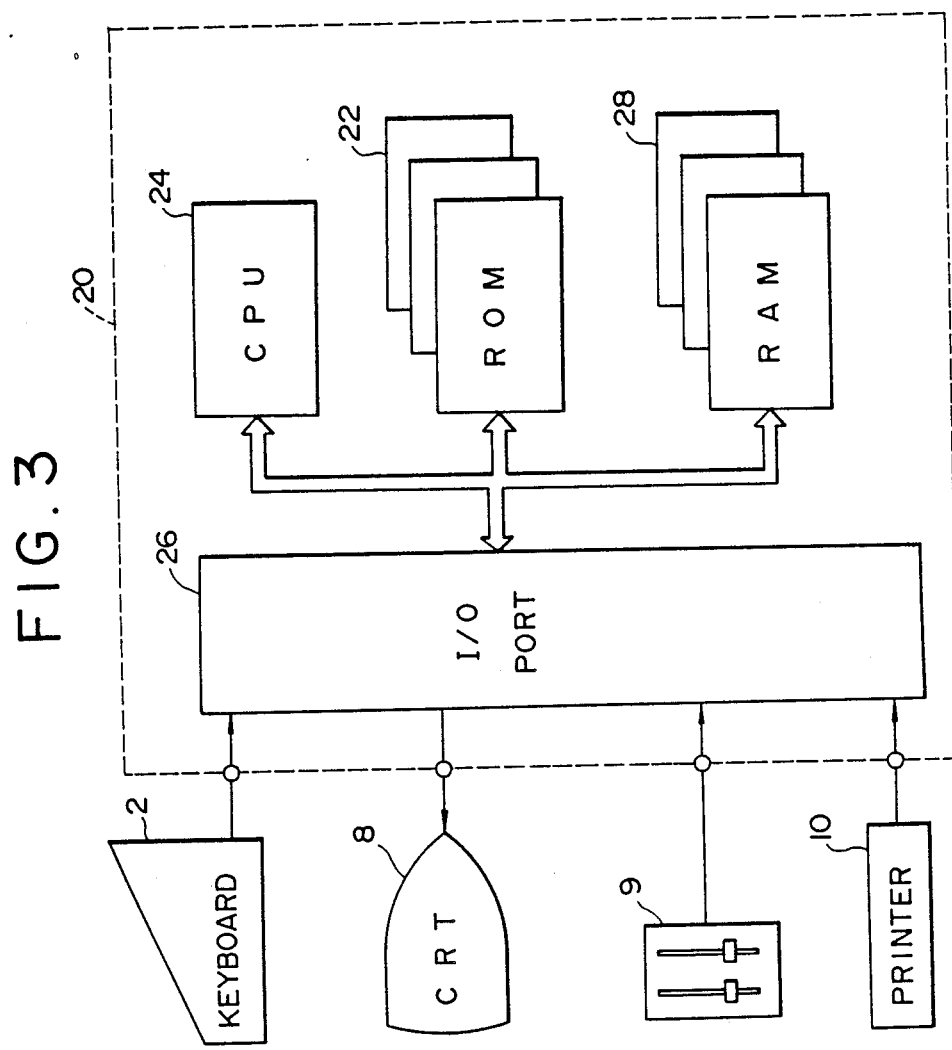

FIG. 6(A)
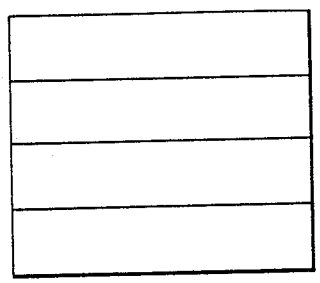
FIG. 6(B)
AB  (CR)
    (CR)
ST  (CR)
    (CR)
2L  (CR)
    (CR)
3L  (CR)
    (CR)
    (CR)
END (CR)
    (CR)
    (CR)
CD  (CR)
FIG. 7
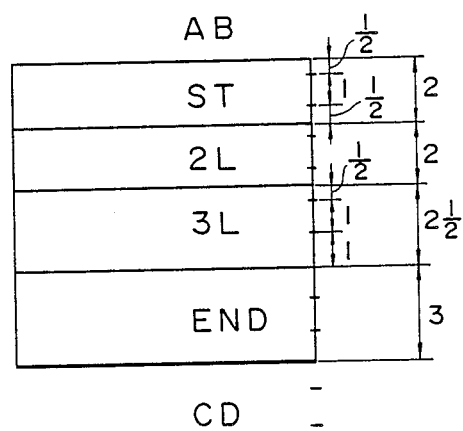

HORIZONTAL LINE POSITION ADJUSTING IN FRAME PROCESSING DEVICE

BACKGROUND OF THE INVENTION

This invention relates to a text processing device capable of representing text data with box frames consisting of horizontal ruled lines dividing text rows and vertical ruled lines separating columns, and more particularly to a text processing device having a function capable of automatically changing vertical positions of horizontal ruled lines based upon intervals of rows adjacently located.

There has been a text processing device of this character that uses, when providing box frames for tabulation or other similar processing, underlines dividing text rows to avoid necessity of extra row spaces for horizontal ruled lines. In such a device, therefore, vertical right and left line segments of an outer box frame are provided by interconnecting the right and left ends of the topmost and bottommost underlines.

Such a text processing device using underlines instead of extra horizontal ruled lines, has however been associated with a problem that, while there has been no particular problem when the row interval is small as shown in FIG. 1(A), enlarging or changing the row spacing has resulted in an unbalanced layout of the horizontal ruled lines and characters on each text line as shown in FIG. 1(B).

In this case, merely changing the position of the underlines with respect to the character strings would not resolve the problem because they will then be deviated from the given position of the right and left vertical ruled lines forming the box frame.

SUMMARY OF THE INVENTION

It is therefore an object of the invention to provide an improved text processing device which is able to prepare a set of ruled lines forming neat-looking box frames in good balance with characters on display.

For this purpose, according to this invention, there is provided a text processing device comprising represent means for representing text data having a plurality of rows with framing data sorrounding the text data, which comprises; vertical rule lines designate means for designating start and end positions of vertical rule lines of the framing data, position designate means for designating positions of horizontal rule lines to be located at a predetermined position between two adjacent columns; and side edge designate means for designating left and right edge positions of the framing data.

DESCRIPTION OF THE ACCOMPANYING DRAWINGS

FIGS. 1(A) and 1(B) are explanatory views showing represent examples in a conventional device.

FIG. 2 is a schematic structural view of the word processor embodying the invention.

FIG. 3 is structural view showing an electonic control system and its peripheral unit of the word processor of FIG. 2, FIGS. 4 and 5 are flow charts of the processings executed by the electronic control system of FIG. 3, FIG. 6 (A) and 6 (B) are illustrative views showing text data and box frame data; and FIG. 7 is a explanatory view showing a represent example in a device according to the invention.

DESCRIPTION OF THE EMBODIMENTS

Figure 4:
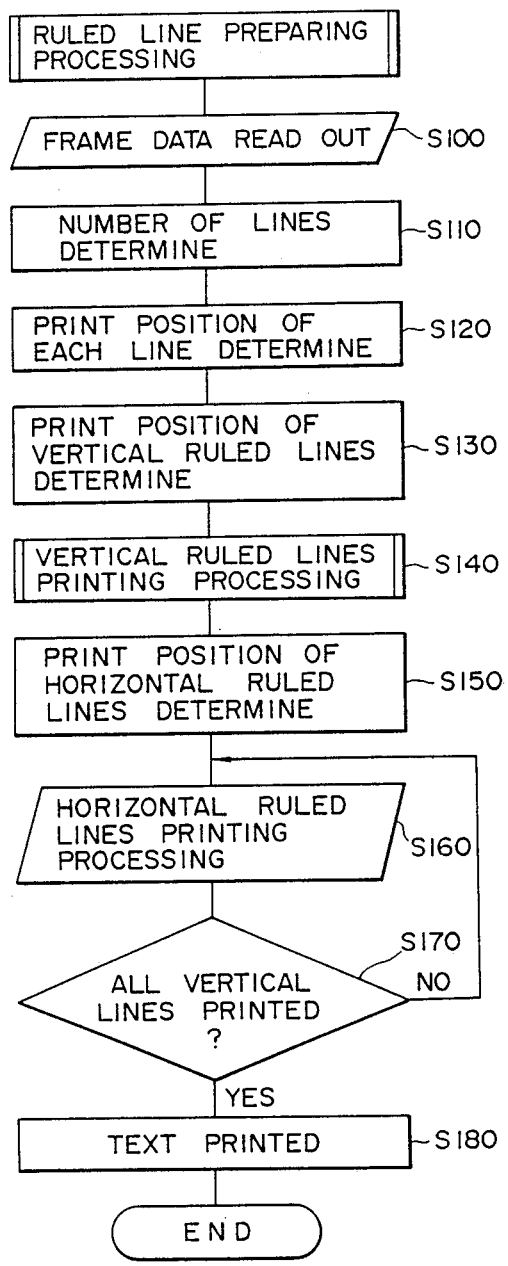

FIG. 2 shows a schematic structural view of a word processor embodying the invention. As shown, the word processor 1 is provided with an input keyboard 2 on which multiple character keys 3 and a space key 4 are placed. Desired character data such as alphabet and numbers can be selected by operating the character keys 3. On the right side of the character keys 3 provided are cursor keys 6 for moving the cursor indicated on the display in four different directions, and a ruled line key 7 used for drawing ruled lines. The word processor 1 further comprises a CRT (Cathode Ray Tube) 8 for displaying that data to be edited or the like, a floppy disk drive unit 9 located on the side of the CRT 8 for recording texts data code or the like on a given medium, and a printer unit 10 for printing characters or the like on a sheet.

An electric configuration of the word processor 1 as stated above is now described with reference to FIG. 3. The word processor 1 includes an electronic control system 20 carrying out logical opertion, which has a ROM (Read Only Memory) 22 with control programs stored in advance for specifying procedures of the logical operations. When a command inputted through the input keyboard 2 to selectively execute any one of those control programs is received by the electronic control system 20, the CPU (Central Processing Unit) 24 interprets the command and starts execution of the control program according to the command inputted through the input keyboard 2. The I/O (Input/Output) port 26 for controlling data communication between the electronic control system 20 and an external unit such as input keyboard 2 and CRT 8 contains therein a buffer and as required, a multiplexer and an A/D (Analogue/Digital) converter as known in the art. A RAM (Random Access Memory) 28 stores information tentatively and helps operation of the CPU 24, while also serving for faster information processing. The word processor 1 with the arrangement as stated above thus provides fundamental functions of preparing, storing and editing texts.

A ruled line preparing processing to be executed by the aforementioned electronic control system 20 is now described with reference to the flow chart shown in FIG. 4. This processing includes drawing horizontal ruled line intermediate betwen specified print lines in accordance with a frame data stored in memory in advance, preparing vertical ruled lines by interconnecting the both ends of the horizontal lines to thereby generate box frames and printing text data, for example, characters and symbols, in the box frames. The processing begins with key entry through the ruled line key 7.

When this processing starts, the frame data with ruled lines as shown in FIG. 6(A) is read into the text data (step 100: all other steps are hereinafter referred to as "S"). The number of lines is determined in dependence on the ruled line data (S110). For instance, the frame data shown in FIG. 6(A) gives the number of lines "4". The print position of each line is then given in dependence on the text data corresponding to the frame data and another text data one line prior to and after the text data (S120), whereby start and end positions of the vertical ruled line are given in accordance with the the information on the position in which the text is printed (S130). Text data printing is accomplished, as shown in FIG. 6(B), by printing "AB", feeding two lines and printing "ST", feeding two lines and printing "2L", feeding two lines and printing "3L", feeding three lines and printing "END", and feeding three lines and printing "CD". The data to be printed within the box frames are "ST", "2L", "3L" and "END". Start and end positions of the vertical ruled line can be given as follows: each position is determined by horizontal and vetical components. At first, the horizontal position is given by "TAB" positions determining the start and end positions of the horizontal ruled line data. The vertical start and end positions "K" is given by a following equation as a displacement from a preceding or a succeeding line, $$K=(m-1)/2$$

where,
m: interval between two rows adjacently located.

while the vertical end position is given by adding the number of all fed text lines to the vertical start position. In this embodiment, the start position is ½ line under the "AB" line and the vertical end position is one line under the "END". Thus, the length of the vertical line corresponds to 9+(½) lines.

The vertical line is then printed (S140), whereupon the horizontal line position between each two lines adjacently located are computed (S150). The horizontal ruled line positions "L" between text lines is represented by a following equation:

$$L=n+1+\{(m-1)/2\}$$

where,
n: interval between an underline position of preceding column and an upper horizontal ruled line; and
m: interval between two rows adjacently located.

In this embodiment, as shown in FIG. 7, the vertical position of a ruled line located between the "ST" line and the "2L" line, represented as an interval from the line located between the "AB" line and the "ST" line is "2". In this case, interval between the underline position of "ST" line and the upper horizontal ruled line (between "AB" line and "ST" line) is "0.5", i.e., (m−1)/2=0.5, and the interval between the upper position of "ST" column and the preceding horizontal line (located between "AB" and "ST") is "0.5", i.e., n=0.5. Further, a column width is "1". Accordingly, as shown in FIG. 7, the first horizntal ruled line position (between "ST" and "2L") becomes "2". Similarly, the second horizontal ruled line position (between "ST" and "3L") becomes "2" and the third horizontal ruled line position (between "3L" and "END") becomes "2.5".

The horizontal ruled lines are then printed after displacement of the horizontal ruled line positions between text lines as operted in S150 (S160). This is repeated until all the horizontal ruled lines are printed (S170), and the text data is printed within the box frames (S180) then terminating the processing.

Figure 5:
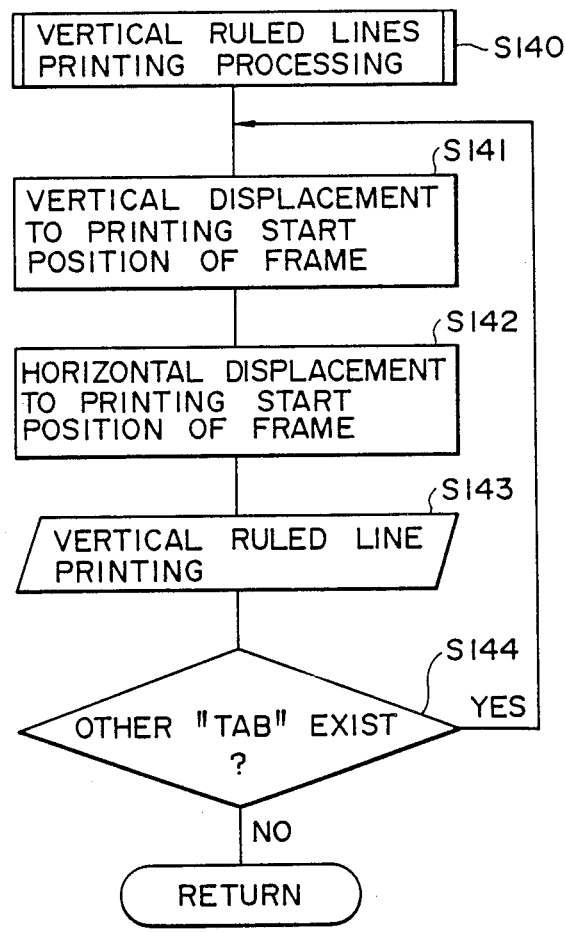

Printing the vertical lines as mentioned in S140 is now described with reference to FIG. 5. At first, vertical and horizontal displacement takes place until the print start position for the vertical ruled line is reached (S141, S142), then printing the vertical ruled line (S143). It is then examined whether or not there is a horizontal "TAB" setting to thereby print the next vertical ruled line (S144). If there is another "TAB" setting remaining, the processing returns to the step for displacement of the carrier (S141), while if printing is all completed, the processing is terminated.

According to the processing as described above, the text processing device of this embodiment provides, in dependence on the frame data stored in advance, horizontal ruled lines intermediate between spaced text lines, then computing start and end positions of the vertical ruled lines based on the both ends of each horizontal ruled line and drawing vertical ruled lines. The box frames are thus printed to allow the text to be printed within them. It therefore makes it unnecessary either to enter a frame data after preparation of the text taking the text line spacing into account or to merge-print the frame data and the text data prepared in advance. This results in an excellent advantage of eliminating bothersome works to prepare box frames.

While the text processing device of this embodiment provides printing processing on a printer, it may be applied to a plotter or a display processing unit as on a CRT.

Further, the present invention is not limited to these embodiments but various other embodiments and modifications are possible without departing the subject matter of the present invention.

What is claimed is:

1. A text processing device comprising represent means for representing text data having at least a plurality of rows with a frame surrounding said text data, which comprises;
    vertical rule lines designate means for designating start and end positions of vertical rule lines of said frame based upon the highest position and the lowest position of the text data to be surrounded by said frame,
    position designate means for automatically designating positions of horizontal rule lines to be located at the middle of two rows adjacently positioned; and
    side edge designate means for designating left and right edge positions of said frame.

2. The text processing device according to claim 1 wherein said represent means comprises a printing medium.

3. The text processing device according to claim 1 wherein said represent means comprises a display.

4. The text processing device according to claim 1 wherein said positions designated by said side edge designate means are TAB positions.

5. The text processing device according to claim 1 which further comprises memory means for storing text data codes and framing data codes.

6. The text processing device according to claim 5 wherein said memory means comprises a floppy disk drive unit.

7. A text processing device comprising represent means for representing text data having a plurality of rows with a frame surrounding said text data, which comprises;
    vertical rule lines designate means for designating start and end positions of vertical rule lines of said frame based upon the highest position and the lowest position of the text data to be surrounded by said frame,
    underline positions adjust means for automatically adjusting underline positions to be located in the middle of adjacently positioned rows; and
    side edge designate means for designating left and right edge positions of said frame.

8. The text processing device according to claim 7 wherein said positions designated by said side edge designate means are TAB positions.

9. A text processing device comprising represent means for representing text data having a plurality of rows, with a frame surrounding said text data, which comprises:

vertical rule lines designate means for designating start and end positions of vertical rule lines of said frame based upon the highest position and the lowest position of the text data to be surrounded by said frame;

underline positions adjust means for automatically adjusting underline positions to be located in the middle of the two rows; and side edge designate means for designating left and right edge positions of said frame.

10. The text processing device according to claim 9 wherein said positions designated by said side edge designate means are TAB positions.

11. The text processing device according to claim 9 wherein at least one RETURN data is located between two rows in the text data and each of the intervals between two rows are determind in accordance with a number of the RETURN data located between two rows.

* * * * *